United States Patent [19]

Nintz et al.

[11] 4,029,614

[45] June 14, 1977

[54] PARTICULATE EXPANDABLE STYRENE POLYMERS HAVING GOOD PROCESSABILITY

[75] Inventors: Eckhard Nintz; Rupert Schick, both of Ludwigshafen; Karl Seegmueller, Lambsheim; Erhard Stahnecker, Heidelberg, all of Germany

[73] Assignee: BASF Aktiengesellschaft, Ludwigshafen, Germany

[22] Filed: Apr. 12, 1976

[30] Foreign Application Priority Data

May 9, 1975 Germany.................... 2520635

[21] Appl. No.: 676,248

[52] U.S. Cl. .............. 260/2.5 B; 260/2.5 AB; 260/2.5 FP

[51] Int. Cl.$^2$ ................................ C08J 9/18

[58] Field of Search ....... 260/2.5 B, 2.5 HB, 2.5 FP

[56] References Cited

UNITED STATES PATENTS 3,274,133  9/1966  Ingram ............ 260/2.5 FP

*Primary Examiner*—Morton Foelak
*Attorney, Agent, or Firm*—Keil, Thompson & Shurtleff

[57] ABSTRACT

Particulate expandable styrene polymers containing organic halogen compounds and, to improve processability, from 0.0001 to 1.0% by weight, based on the styrene polymer, of an amine which is soluble in styrene and free from hydroxyl groups.

8 Claims, No Drawings

PARTICULATE EXPANDABLE STYRENE POLYMERS HAVING GOOD PROCESSABILITY

Foamed articles are manufactured industrially by expanding particulate expandable styrene polymers. In this process, particulate styrene polymers are first heated with steam or hot gases to temperatures above their softening point so as to effect foaming to form discrete particles. This operation, during which the particles are allowed sufficient space to expand freely, is known as pre-expansion. The pre-expanded styrene polymers are then left for a period (about 24 hours) before being further expanded in a pressure-tight mold by renewed heating with steam, during which operation the particles become fused together on account of the limited space available to form a shaped article corresponding in size and shape to the cavity of the mold used. This second operation is known as molding. If deformation of the shaped articles is to be avoided, it may be removed from the mold only after its center portions have cooled to temperatures below its softening point.

Since foamed plastics materials are good heat insulators, relatively long periods are required for cooling the shaped articles. The period during which the shaped articles must remain in the mold to avoid further expansion thereof on removal from the mold is usually referred to as the mold residence time. A further criterion for the time at which the article may be removed from the mold is the point at which the internal pressure has dropped to almost atmospheric pressure.

The shaped article, after removal from the mold, is usually left for a period until it has cooled completely, after which, for example if it is a block, it may be cut up into sheets for thermal insulation.

Expandable styrene polymers which have been manufactured by an economical short polymerization process, i.e. at polymerization temperatures of from 80° to 85° C, and which contain a flameproofing organic halogen compound form, on foaming, materials having a fine cellular structure of from 12 to 15 cells per mm. Blocks of foam having such a cellular structure not only tend to suffer from considerable inward sag of their side walls sometime after removal from the mold but also show poorer fusion within the block. Furthermore, a fine-cellular foamed structure causes an unfavorable thermal conductivity coefficient (thermal conductivity $\lambda$) of more than 0.0322 kcal/m . hr.° C, this being the maximum permissible value according to DIN 52,612.

Foams of expandable polystyrene having a cell count of about 3 to 6 per mm come below this maximum value. That is, they are better thermal insulators.

German Published Application 2,104,867 discloses that expandable styrene polymers which have been prepared above 80° C and contain an organic halogen compound as flameproofing agent will form satisfactorily fused blocks of foam showing no tendency to collapse at the side walls, if they contain a styrene-soluble alkoxylation product of ammonia or of a primary or secondary aliphatic amine. The said alkoxylation products are also designated as alkanolamines.

We have now found, surprisingly, that styrene-soluble amines not containing hydroxyl groups, regardless of whether they are primary, secondary or tertiary amines, have an even better influence on the important processing properties of fusion and dimensional stability of blocks of foams of expandable polystyrene containing organic halogen compounds. Products prepared in this manner may be processed to form foamed shaped articles showing even better fusion. There is also a better relationship between the amount of additive (amine) introduced and the processing properties of fusion and dimensional stability and the cell count of the foam in the region of from 3 to 12 cells per mm, a decrease in the number of cells giving improvement in the quality of fusion and dimensional stability. Furthermore, since the mold residence time of foamed articles (blocks) bears a certain relationship to the cell count of the foam (a higher number of cells reduces the mold residence time), it is possible, by adding various amounts of amine, to obtain virtually continuous modification of the properties of the product to comply with different applications. The amine-containing styrene polymers of the invention also have a greater processing range, characterized by variable steam pressure during molding.

A suitable process for the manufacture of the expandable styrene polymers of the invention containing an organic halogen compound consists in polymerizing styrene in known manner, optionally together with conventional comonomers, in aqueous suspension using free radical initiators at temperatures above 80° to 85° C and adding, before or during polymerization, an amine which is soluble in the organic phase of the suspension.

Suitable additives of the invention are primary, secondary and tertiary amines which may contain aliphatic or cycloaliphatic and in some cases aromatic hyrocarbon radicals and have the following constitution: $NR^1R^2R^3$, where $R^1$ is an aliphatic or cycloaliphatic hydrocarbon radical of from 4 to 20 carbon atoms, $R^1$ having from 6 to 20 carbon atoms when $R^2$ and $R^3$ are both hydrogen, and wherein $R^2$ is hydrogen or an aliphatic or cycloaliphatic hydrocarbon radical of from 1 to 15 carbon atoms and $R^3$ is hydrogen or an aliphatic or aromatic hydrocarbon of from 1 to 15 carbon atoms.

The said hydrocarbon radicals may, together with the amine nitrogen, form a ring. The amine may contain other functional groups with the exception of hydroxyl groups and may therefore be, for example, a diamine or an amino acid or ester thereof.

The effectiveness of the amines of the invention would appear to depend not only on good solubility in the organic phase of the suspension but also, to a certain extent, on its basicity.

The amines claimed are used in amounts of from 0.0001 to 1% but preferably from 0.001 to 0.1%, by weight of the styrene polymer. In all cases, the amount used is small compared with the amount of organic halogen compound added. The substances may be added either to the organic phase or to the aqueous phase or to the reaction mixture before, during or at a point near completion of the polymerization. The most suitable amount of amine to be added in each case depends on the amount and type of halogen compound incorporated and on the temperature profile used during polymerization and may be readily determined by simple experiment.

Starting materials for the manufacture of the styrene polymers of the invention are monomer mixtures which contain at least 50% by weight of styrene and optionally, as comonomers, for example $\alpha$-methylstyrene, nuclear halogenated styrenes, acrylonitrile, acrylates and methacrylates of alcohols of from 1 to 8 carbon atoms, N-vinyl compounds such as N-vinyl carbazole and small amounts of butadiene or divinylbenzene if desired.

Polymerization is conveniently carried out by the well-known bead polymerization process at temperatures of from 80° to 130° C. It is initiated in the usual way using one or more free radical substances, examples of which are t-butyl perbenzoate, t-butyl peroctoate, di-t-butyl peroxide, dibenzoyl peroxide and mixtures thereof.

Specific examples of organic halogen compounds are bromine compounds such as brominated oligomers of butadiene or isoprene having an average degree of polymerization of from 2 to 20. Bromination may be complete or partial.

Typical representatives are, for example, 1,2,5,6,-tetrabromocyclooctane, 1,2,5,6,9,10-hexabromocyclododecane, brominated polybutadiene having a degree of polymerization of, say, from 3 to 15 and $1(\alpha,\beta$-dibromoethyl)-3,4-dibromocyclohexane. Also effective in combination with the amines proposed herein are the following halogen compounds from other classes of substances: brominated phosphoric acid esters, nuclear brominated phenyl alkyl ethers, pentabromo monochlorocyclohexane and 1,3,4-tribromo-4-phenylbutanone-(2). The organic halogen compounds may be present in the expandable styrene polymers in amounts of from 0.05 to 1% by weight or, when used as flameproofing agents, in amounts of from 0.4 to 3% by weight. For the latter purpose the presence of synergistic substances such as di-t-butyl peroxide, dicumyl peroxide and poly-p-diisopropylbenzene may be advantageous.

Suitable suspension stabilizers which may be used are organic protective colloids such as polyvinyl alcohol, polyvinyl pyrrolidone and polyvinyl pyrrolidone copolymers or mmineral suspending auxiliaries such as finely divided tricalcium phosphate and barium sulfate.

The expanding agents used in the process of the invention are liquid or gaseous organic compounds which are non-solvents for the styrene polymer and have a boiling point below the softening point of the polymer, examples being aliphatic hydrocarbons such as propane, butane, pentane, hexane, cyclohexane and halohydrocarbons such as methyl chloride, dichlorodifluoromethane, trichloromonofluoromethane and 1,2,2-trifluoro-1,1,2-trichloroethane. Mixtures of the expanding agents may also be used. The expanding agents are usually employed in amounts of from 2 to 20% and preferably from 3 to 12%, by weight of the monomers.

The expandable styrene polymers may also contain additives such as dyes, fillers and stabilizers. Immediately after manufacture they are in a finely divided state, for example in the form of beads having a particle diameter generally of from 0.1 to 6 mm and preferably of from 0.4 to 3 mm. They are then pre-expanded and subsequently heated in closed, non-gastight molds for molding by conventional processes to be fused together to form foamed shaped articles having contours corresponding to the size and shape of the cavity of the molds used. The styrene polymers of the invention provide shaped articles showing a very high degree of dimensional stability. Foamed blocks measuring about 1 × 1 0.5 m show only a very slight tendency to sag inwardly at their side walls on removal from the mold. The foamed shaped articles or blocks are also distinguished by particularly good quality of fusion. They therefore show particularly good mechanical stability.

EXAMPLE 1

Test 1a

The following mixture is placed in a stirred pressure vessel having a capacity of 1,000 1 and purged with nitrogen:

454 kg of water having a hardness of 15° dH (German scale)
365 g of sodium acetate
412 kg of styrene
4.2 kg of acrylonitrile
1.07 kg of t-butyl perbenzoate
632 g of dibenzoyl peroxide
825 g of dicumyl peroxide
2.7 kg of 1,2,5,6,9,10-hexabromocyclododecane
21 g of n-dodecylamine.

The mixture is then polymerized with stirring in the closed vessel for 3 hours at 80° C, 2 hours at 100° C and, finally, 7 hours at 115° C. 15 kg of a 10% aqueous solution of polyvinylpyrrolidone having a K value of from 85 to 90 (measured by the method proposed by Fikentscher in Cellulosechemie, 13, 58 (1932)) is added at such a rate that the average bead diameter is from 1.2 to 1.6 mm. 3.5 hours after the temperature of 80° C is reached, 30 kg of a mixture of 25% by weight of isopentane and 75% by weight of n-pentane are metered to the vessel over from 10 to 15 minutes.

After the resulting expandable polystyrene particles have been dried to a water content of 0.3% by weight, they are prefoamed in a commercial prefoamer in a flow of steam to a bulk density of 15 g/1. The prefoamed material is then left for 24 hours at room temperature with access to air. It is then included in a conventional mold measuring 100 × 50 × 100 cm under the action of steam to form blocks. To test the processing range, the steam used for making the foamed blocks was injected at pressures of from 0.5 to 0.9 atmosphere gauge. Within this range of steam pressures blocks showing only very slight collapse of the large side surfaces (dimensional stability) and excellent fusion of the particles were formed, this indicating a relatively large processing range.

Numerical data are listed in the Table below.

The number of cells per mm were counted under a microscope using a slice of foamed material (thickness about 0.3 mm) taken from the center of the block of foam. This slice was found to contain 4.9 cells/mm. Test on the thermal insulating properties of this foam gave a coefficient of thermal conductivity of 0.0308 kcal/m . hr. ° C.

Test 1b

The same mixture as used in Test 1a was polymerized in the same manner except that twice the amount (42 g) of n-dodecylamine is present. Pretreatment and processing of the resulting product as described in Example 1a produces foamed blocks which show only slight collapse of the large side walls when steamed at the relatively high pressure of 0.9 atmosphere gauge. Foamed blocks prepared under milder conditions show no collapse of the side walls. Numerical data are listed in the Table.

As in Test 1a, a cell count was carried out on a slice of foam taken from the center of the block. It was found to contain 3.9 cells/mm and had a coefficient of thermal conductivity of 0.0296 kcal/m .hr.° C.

Test 1c

In a third test, the same mixture was polymerized under the same conditions as in Example 1a but in the presence of 21 g of N,N-dicyclohexylamine. The resulting expandable polystyrene particles could be processed to foamed blocks showing good dimensional stability and fusion of the particles, as may be seen from the Table below. A slice of foam taken from the center of the block contained 4.8 cells/mm and presumably had a good coefficient of thermal conductivity in view of the results obtained in Tests 1a and 1b.

Test 1d

Using twice the amount of N,N-dicyclohexylamine (42 g), the mixture was polymerized as in Tests 1a – 1c. There was thus obtained a product capable of being processed to blocks having very good dimensional stability and excellent fusion. Even when steaming was carried out at the highest pressure of 0.9 atmosphere gauge, only very slight collapse of the large side walls was observed. The results are listed in the form of numerical data in the Table below.

The cell count of 3.4/mm in a slice of the foam indicates a coefficient of thermal conductivity of less than 0.0322 kcal.hr.° C.

EXAMPLE 2

Test 2a

The following mixture is used:

454 kg of water having a hardness of 15° dH
330 g of sodium acetate
387 kg of styrene
1.0 kg of t-butyl perbenzoate
0.59 kg of dibenzoyl peroxide
0.25 kg of 1,2,5,6,9,10-hexabromocyclododecane
8.5 g of n-tetradecylamine.

The mixture is polymerized with stirring in a closed vessel for 4 hours at 90° C, 2 hours at 105° C and, finally, 3 hours at 120° C. 15 kg of a 10% aqueous solution of polyvinylpyrrolidone having a K value of 85 are added at such a rate that the average bead size is from 1.2 to 1.6 mm. 3 hours after the temperature of 90° C is reached, 30 kg of a mixture of 25% by weight of isopentane and 75% by weight of n-pentane are metered to the vessel over from 10 to 15 minutes. Working up and testing of the expandable styrene polymer obtained are carried out by the methods described in Example 1a. The blocks of foam prepared at steam pressures of from 0.5 to 0.9 atmosphere gauge showed slightly more collapse of the large side walls than in the previous tests on account of the greatly reduced amount of amine used. However, an advantage was the shorter mold residence time required. The fusion was as good as in the previous tests.

As was to be expected from the shorter mold residence time, a slice taken from the center of the block of foam showed a finer cellular structure. The cell count was 7.5 cells/mm.

Test 2b

The same mixture as described under Test 2a was polymerized under similar conditions but in the presence of 21 g of n-tetradecylamine. Treatment similar to that described in Test 2a gave blocks of foam showing considerably improved dimensional stability (less collapse of the large side walls) over the product of Example 2a. Furthermore, the cellular structure was coarser, the cell count being 5.3 cells/mm. The coefficient of thermal conductivity was 0.0314 kcal/m.hr.° C.

Test 2c

In a third test, the same mixture was polymerized under the same conditions as described in Test 2a but in the presence of 42 g of N-butyl-N-2-ethylhexylamine. The resulting expandable polystyrene particles could be processed to form blocks of foam showing good dimensional stability and excellent fusion.

A slice or foam taken from the center of the block had a cell count of 3.7 cells/mm and presumably had a good coefficient of thermal conductivity in view of Tests 2a and 2b.

EXAMPLE 3

In a further test, the following mixture was polymerized:

480 kg of water having a hardness of 15° dH
360 g of sodium acetate
410 kg of styrene
1.2 kg of t-butyl perbenzoate
0.33 kg of dibenzoyl peroxide
0.82 kg of dicumyl peroxide
3.5 kg of pentabromomonochlorocyclohexane
21 g of N,N-dihexylamine.

The mixture is heated in a sealed vessel with stirring for 3 hours at 90° C, 1 hour at 100° C, 1 hour at 100° C, 1 hour at 110° C and, finally, 5 hours at 115° C. An aqueous 10% polyvinylpyrrolidone solution (13 kg) is added at such a point in the process that the average particle size is from 1.4 to 1.6 mm. 2.5 hours after the temperature of 90° has been reached, 31 kg of n-pentane are metered to the batch over 15 minutes.

The worked-up, expandable styrene polymer was subjected to the processing test of Example 1a. There were obtained blocks in the manufacture of which steaming pressures of from 0.5 to 0.9 atmosphere gauge could be applied without any substantial collapse of the large side walls being observed.

In the manner described in the above Examples, a slice of foam taken from the center of the block was used for counting the cells. The cell count was 4.2/mm and gave the coefficient of thermal conductivity of 0.0298 kcal/m.hr.° C.

EXAMPLE 4

In a further experiment, the following mixture was polymerized in the presence of the halogen compound pentabromophenylallyl ether:

450 kg of water having a hardness of 5° dH
330 g of sodium acetate
420 kg of styrene
4.5 kg of acrylonitrile
1.3 kg of t-butyl perbenzoate
0.15 kg of t-butyl peroctoate
0.76 kg of dicumyl peroxide
4.2 kg of pentabromophenylallyl ether
21 g of N,N-dicyclohexylamine.

The mixture was polymerized with stirring in a sealed vessel for 2 hours at 85° C, 2 hours at 105° C and then 10 hours at 115° C. The aqueous 10% polyvinylpyrrolidone solution is added at such a point in the process that the average particle size is from 1.4 to 1.6 mm. 3.5 hours after the temperature of 85° C has been reached, 26 kg of a mixture of 75% by weight of n-pentane and 25% by weight of isopentane is metered to the vessel over 15 minutes.

There was obtained a product which could be processed to dimensionally stable blocks of foam showing excellent fusion.

A slice of foam was taken from the center of the block for the purpose of counting the cells. The cell count was 4.2/mm. Tests on the thermal insulating properties of this foam gave a coefficient of thermal conductivity of 0.0302 kcal/m.hr.° C.

EXAMPLE 5 (COMPARATIVE TEST)

Example 1a was repeated but in the absence of a foam-regulating amine. The resulting product was only capable of forming blocks of inadequate dimensional stability and fusion. The cell count was 12/mm and the foam possessed inadequate heat insulating properties (coefficient of thermal conductivity 0.035 kcal/m.hr.° C).

TABLE

Side-wall collapse and quality of fusion of blocks of foam prepared from the expandable styrene polymers of the invention

| Example | Steam pressure in the mold atm.gauge | Steaming time in seconds[1] | Quality of fusion in %[2] | % collapse of large side walls[3] |
|---|---|---|---|---|
| 1a | 0.9 | 0 | 95 | −0.6 |
|  | 0.8 | 20 | 85 | −0.4 |
| 1b | 0.9 | 0 | 95 | −0.4 |
|  | 0.8 | 20 | 90 | ±0.0 |
| 1c | 0.8 | 20 | 80 | −0.4 |
|  | 0.5 | 50 | 75 | ±0.0 |
| 1d | 0.8 | 20 | 95 | ±0.0 |
|  | 0.5 | 50 | 90 | ±0.0 |
| 2a | 0.8 | 20 | 80 | −1.4 |
|  | 0.5 | 50 | 75 | −0.8 |
| 2b | 0.8 | 20 | 85 | −0.6 |
|  | 0.5 | 50 | 85 | −0.2 |
| 2c | 0.8 | 20 | 95 | ±0.0 |
|  | 0.5 | 50 | 90 | ±0.0 |
| 3 | 0.8 | 20 | 85 | −0.3 |
|  | 0.5 | 50 | 80 | ±0.0 |
| 4 | 0.8 | 20 | 80 | −0.4 |
|  | 0.5 | 50 | 75 | ±0.0 |
| 5 (Comparative test) | 0.8 | 20 | 30 | −4.8 |
|  | 0.5 | 50 | 15 | −3.6 |

[1] The steaming time is the time neasured from the moment at which the stated steam pressure is reached in the mold to the moment at which the steam inlet valve is closed.
[2] The quality of fusion is taken to be the ratio of the number of fractured particles to the total number of particles × 100 over an area of fracture produced by force. The specimens used for this test were sheets of foam measuring 100 × 100 × 5 cm.
[3] Collapse of the side walls is measured 24 hours after removal of the block foam from the mold. This is determined by measuring the thickness of the block from the center of one large wall to the center of the opposite large wall. The difference between the internal dimension of the mold at the corresponding points and the measured thickness of the block, converted to percentage of the said internal dimension, is the percentage collapse.

We claim:

1. Expandable styrene polymers containing a foaming agent and from about 0.05 to 1% by weight of the styrene polymer of brominated oligomers of butadiene or styrene, brominated phosphoric acid esters, nuclear brominated phenyl alkyl ethers, pentabromo monochlorocyclohexane or 1,3,4-tribromo-4-phenylbutanone-(2) and additionally containing from 0.0001 to 1.0% by weight of the styrene polymer, of a styrene-soluble amine free from hydroxyl groups, said amine having the formula $NR^1R^2R^3$, wherein $R^1$ is an aliphatic or cycloaliphatic hydrocarbon radical of from 4 to 20 carbon atoms, $R^2$ is hydrogen or an aliphatic or cycloaliphatic hydrocarbon radical of from 1 to 15 carbon atoms, and $R^3$ is hydrogen or an aliphatic or aromatic hydrocarbon of from 1 to 15 carbon atoms, with the proviso, that when $R^2$ and $R^3$ are both hydrogen, then $R^1$ has from 6 to 20 carbon atoms.

2. Expandable styrene polymers as claimed in claim 1, in which the styrene soluble amine is a primary amine.

3. Expandable styrene polymers as claimed in claim 1, in which the styrene-soluble amine is a secondary amine having as side chain a linear, branched or cyclic alkyl radical, the amine nitrogen atom optionally forming part of a ring.

4. Expandable styrene polymers as claimed in claim 1, wherein the styrene-soluble amine is a tertiary amine having as side chain a linear, branched or cyclic alkyl radical, the amine nitrogen atom optionally forming part of a ring.

5. Expandable styrene polymers as claimed in claim 4, wherein the side chain contains aromatic groups.

6. Expandable styrene polymers as claimed in claim 1, wherein the styrene-soluble amine contains 2 or more amino groups.

7. Expandable styrene polymers as claimed in claim 1, wherein the styrene-soluble amine contains functional groups, except hydroxyl groups, in the alkyl side chains.

8. Expandable styrene polymers as claimed in claim 1, wherein the styrene-soluble amine is present in the amount of from 0.001 to 0.1% by weight based on the styrene polymer.

* * * * *